United States Patent
Peuhkurinen

(10) Patent No.: US 11,054,658 B2
(45) Date of Patent: Jul. 6, 2021

(54) DISPLAY APPARATUS AND METHOD USING REFLECTIVE ELEMENTS AND OPACITY MASK

(71) Applicant: Varjo Technologies Oy, Helsinki (FI)

(72) Inventor: Ari Antti Peuhkurinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/778,883

(22) Filed: Jan. 31, 2020

(65) Prior Publication Data

US 2020/0233222 A1 Jul. 23, 2020

Related U.S. Application Data

(63) Continuation-in-part of application No. 16/253,954, filed on Jan. 22, 2019, now Pat. No. 10,764,567.

(51) Int. Cl.
| | |
|---|---|
| G02B 27/01 | (2006.01) |
| G02B 27/00 | (2006.01) |
| H04N 9/31 | (2006.01) |
| G06F 3/01 | (2006.01) |
| G02B 27/30 | (2006.01) |

(52) U.S. Cl.
CPC ..... *G02B 27/0179* (2013.01); *G02B 27/0093* (2013.01); *G02B 27/30* (2013.01); *G06F 3/013* (2013.01); *H04N 9/3185* (2013.01); *G02B 2027/0187* (2013.01)

(58) Field of Classification Search
CPC . G02B 27/0179; G02B 27/0093; G06F 3/013; H04N 9/3185
See application file for complete search history.

(56) References Cited

U.S. PATENT DOCUMENTS

| | | | | |
|---|---|---|---|---|
| 2009/0244084 A1* | 10/2009 | Dammertz | ............ | G06T 11/001 345/586 |
| 2015/0078629 A1* | 3/2015 | Gottemukkula | ........ | G06T 11/60 382/117 |
| 2016/0377865 A1* | 12/2016 | Alexander | .............. | G06F 1/163 345/8 |
| 2019/0212560 A1* | 7/2019 | Sugiyama | .............. | B60K 37/06 |

\* cited by examiner

*Primary Examiner* — Jonathan R Messmore
(74) *Attorney, Agent, or Firm* — Ziegler IP Law Group, LLC

(57) ABSTRACT

A display apparatus including means for detecting gaze direction of user; first and second image renderers; processor, processor or external processor processes input image to generate first image and second image, processor renders first and second images simultaneously; configuration of reflective elements arranged to split light emanating from second image renderer into plurality of directions to produce plurality of projections of second image in tiled layout; optical combiner; and opacity mask that is controlled based upon gaze direction to selectively allow given portion of the projections to pass through towards optical combiner, whilst blocking remaining portion of projections. Optical combiner is arranged to optically combine projection of first image with given portion of the projections, to produce on image plane an output image.

14 Claims, 9 Drawing Sheets

DISPLAY APPARATUS AND METHOD USING REFLECTIVE ELEMENTS AND OPACITY MASK

This application is a continuation-in-part of U.S. patent application Ser. No. 16/253,954, titled "DISPLAY APPARATUS AND METHOD OF DISPLAYING," filed on Jan. 22, 2019.

TECHNICAL FIELD

The present disclosure relates generally to display apparatuses; and more specifically, to display apparatuses comprising means for detecting gaze direction, first image renderers, second image renderers, processors, configurations of reflective elements, optical combiners, and opacity masks. Moreover, the present disclosure also relates to methods associated with the aforementioned display apparatuses.

BACKGROUND

Presently, several technologies (for example, such as virtual reality (VR), augmented reality (AR), mixed reality (MR) and the like) are being used to present interactive extended-reality environments to users. Typically, the users utilize specialized devices (for example, such as a virtual reality device, an augmented reality device, a mixed reality device, and the like) for experiencing and interacting with such extended-reality environments. In use, the user generally wears (namely, supports) the specialized device on his/her head.

Conventional specialized devices employ various equipment in order to generate and render images that constitute the extended-reality environment. Generally, the specialized devices render different offset views of the images that constitute the extended-reality environment, via image renderers associated with different eyes of the user. It is desired that the images have high resolution and a large field of view, to provide an immersive viewing experience to the user.

However, the conventional specialized devices have certain limitations associated therewith. As an example, some specialized devices use large high-resolution image renderers for rendering the images. These large high-resolution image renderers are generally not available in a small form factor, or when available, they are extremely expensive. Use of such image renderers causes such specialized devices to become very expensive for both consumers, as well as prosumers. As another example, some specialized devices, in principle, employ complex arrangements of moving optical elements, multiple screen setups and/or moving light sources. Dynamically managing such complex arrangements is extremely difficult in practice. Moreover, such complex arrangements would also require considerable space to be properly accommodated in the specialized devices. This would cause the specialized devices to become bulky and cumbersome to use.

Therefore, in light of the foregoing discussion, there exists a need to overcome the aforementioned drawbacks associated with provision of large high-resolution images in specialized devices.

SUMMARY

The present disclosure seeks to provide a display apparatus. The present disclosure also seeks to provide a method. The present disclosure seeks to provide a solution to the existing problems of high component cost and complex component arrangement that are associated with provision of large high-resolution images in conventional display apparatuses. An aim of the present disclosure is to provide a solution that overcomes at least partially the problems encountered in prior art, and provides a display apparatus that provides large high-resolution images at moderate cost using a simple arrangement of components.

In one aspect, an embodiment of the present disclosure provides a display apparatus comprising:

means for detecting a gaze direction of a user with respect to an image plane;

at least one first image renderer;

at least one second image renderer;

a processor coupled to said means, the at least one first image renderer and the at least one second image renderer, wherein the processor or at least one external processor communicably coupled to the processor is configured to process an input image, based upon the detected gaze direction of the user, to generate a first image and a second image, and wherein the processor is configured to render the first image and the second image substantially simultaneously, via the at least one first image renderer and the at least one second image renderer, respectively;

a configuration of reflective elements arranged to split light emanating from the at least one second image renderer into a plurality of directions to produce a plurality of projections of the second image in a tiled layout, wherein at least two reflective elements of said configuration have different reflectance;

an optical combiner; and an opacity mask arranged on an optical path between the configuration of reflective elements and the optical combiner, wherein the processor is configured to control the opacity mask, based upon the detected gaze direction, to selectively allow a given portion of the plurality of projections of the second image to pass through towards the optical combiner, whilst blocking a remaining portion of said plurality of projections, wherein the optical combiner is arranged to optically combine a projection of the first image with the given portion of the plurality of projections of the second image, to produce on the image plane an output image to be presented to the user.

In another aspect, an embodiment of the present disclosure provides a method comprising:

detecting a gaze direction of a user with respect to an image plane;

processing an input image, based upon the detected gaze direction of the user, to generate a first image and a second image;

rendering the first image and the second image substantially simultaneously, via at least one first image renderer and at least one second image renderer, respectively;

splitting, via a configuration of reflective elements, light emanating from the at least one second image renderer into a plurality of directions to produce a plurality of projections of the second image in a tiled layout, wherein at least two reflective elements of said configuration have different reflectance;

controlling an opacity mask, based upon the detected gaze direction, to selectively allow a given portion of the plurality of projections of the second image to pass through towards an optical combiner, whilst blocking a remaining portion of said plurality of projections; and optically combining, via the optical combiner, a projection of the first image with the given portion of the plurality of projections of the second image, to produce on the image plane an output image to be presented to the user.

Embodiments of the present disclosure substantially eliminate or at least partially address the aforementioned problems in the prior art, and enable production of immersive output images that are shown to the user.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 4D illustrates the second image to be rendered, while

Figure 1:
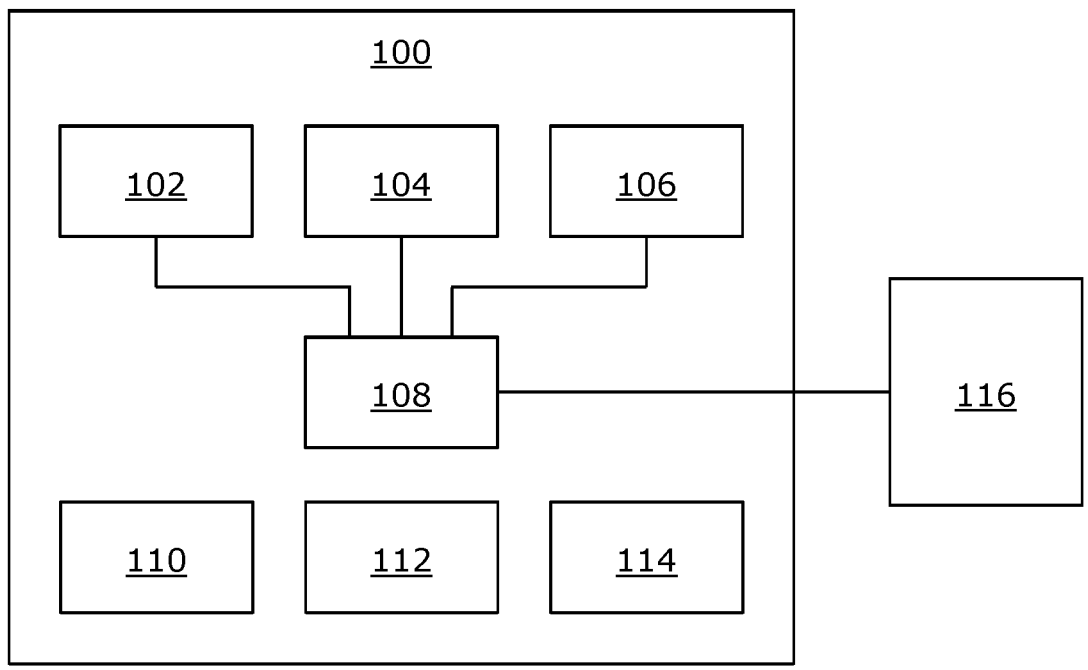
FIGS. 1 and 2 illustrate block diagrams of architectures of a display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:

means for detecting a gaze direction of a user with respect to an image plane;

at least one first image renderer;

at least one second image renderer;

a processor coupled to said means, the at least one first image renderer and the at least one second image renderer, wherein the processor or at least one external processor communicably coupled to the processor is configured to process an input image, based upon the detected gaze direction of the user, to generate a first image and a second image, and wherein the processor is configured to render the first image and the second image substantially simultaneously, via the at least one first image renderer and the at least one second image renderer, respectively;

a configuration of reflective elements arranged to split light emanating from the at least one second image renderer into a plurality of directions to produce a plurality of projections of the second image in a tiled layout, wherein at least two reflective elements of said configuration have different reflectance;

an optical combiner; and an opacity mask arranged on an optical path between the configuration of reflective elements and the optical combiner, wherein the processor is configured to control the opacity mask, based upon the detected gaze direction, to selectively allow a given portion of the plurality of projections of the second image to pass through towards the optical combiner, whilst blocking a remaining portion of said plurality of projections, wherein the optical combiner is arranged to optically combine a projection of the first image with the given portion of the plurality of projections of the second image, to produce on the image plane an output image to be presented to the user.

In another aspect, an embodiment of the present disclosure provides a method comprising:

detecting a gaze direction of a user with respect to an image plane;

processing an input image, based upon the detected gaze direction of the user, to generate a first image and a second image;

rendering the first image and the second image substantially simultaneously, via at least one first image renderer and at least one second image renderer, respectively;

splitting, via a configuration of reflective elements, light emanating from the at least one second image renderer into a plurality of directions to produce a plurality of projections of the second image in a tiled layout, wherein at least two reflective elements of said configuration have different reflectance;

controlling an opacity mask, based upon the detected gaze direction, to selectively allow a given portion of the plurality of projections of the second image to pass through towards an optical combiner, whilst blocking a remaining portion of said plurality of projections; and optically combining, via the optical combiner, a projection of the first image with the given portion of the plurality of projections of the second image, to produce on the image plane an output image to be presented to the user.

The present disclosure provides the aforementioned display apparatus and the aforementioned method. In the display apparatus, high-resolution second images are rendered using moderately-priced second image renderers having small form factor. Then, a tiled layout of these high-resolution second images is formed over a large field of view using the configuration of reflective elements. As a result, the display apparatus provides large high-resolution images without using extremely expensive and large-sized image renderers. This provides an immersive viewing experience to the user. Moreover, the arrangement of various components within the display apparatus is quite simple (as no moving components are employed). The display apparatus is compact and user friendly.

Throughout the present disclosure, the term "display apparatus" refers to specialized equipment that is configured to present an extended-reality environment to the user when the display apparatus in operation is worn by the user on his/her head. In such an instance, the display apparatus acts as a device (for example, such as an extended-reality headset, a pair of extended-reality glasses, and the like) that is operable to present a visual scene of the extended-reality environment to the user. Commonly, the "display apparatus" is referred to as "head-mounted display apparatus", for the sake of convenience only.

Throughout the present disclosure, the term "extended-reality" encompasses virtual reality, augmented reality, mixed reality, and the like.

Throughout the present disclosure, the term "image plane" refers to an imaginary plane on which the output image is produced. The produced output image is visible to the user. Optionally, the image plane is at a distance that lies in a range of 25 cm to 400 cm from a perspective of a user's eye. More optionally, the image plane is at a distance that lies in a range of 50 cm to 100 cm from the perspective of the user's eye.

Throughout the present disclosure, the term "means for detecting the gaze direction" refers to specialized equipment for detecting and/or following a direction of gaze of the user of the display apparatus. Notably, the gaze direction of the user is detected when the display apparatus in operation is worn by the user. Optionally, the means for detecting the gaze direction is implemented by way of contact lenses with sensors, cameras monitoring a position of a pupil of the user's eye, and the like. Such means for detecting the gaze direction are well-known in the art. Beneficially, the means for detecting the gaze direction is arranged in a manner that said means does not cause any obstruction in an optical path of a projection of the output image (that is to be shown to the user). It is to be understood that the means for tracking the gaze direction may also be referred to as an "eye-tracker system", a "gaze-tracking system" or a "means for tracking the gaze direction".

It will be appreciated that said means is employed to detect the gaze direction of the user repeatedly over a period of time, when the display apparatus in operation is worn by the user. Since the processor is coupled to the means for detecting the gaze direction of the user, the processor is configured to receive, from said means, information indicative of the detected gaze direction of the user. The processor is configured to generate the first image and the second image (from the input image) in real-time or near real-time, based upon an instantaneous gaze direction of the user that is detected during operation of the display apparatus.

Optionally, the processor is configured to obtain the input image from an image source that is communicably coupled to the processor. Optionally, the image source comprises at least one camera that is employed to capture an image of a given real-world scene, wherein said image is to be utilized to produce the input image. In such a case, the image of the given real-world scene could be directly utilized as the input image, or may be processed to produce the input image. Additionally or alternatively, optionally, the image source comprises a computer that produces the input image. In an embodiment, the input image is entirely generated by the computer. In another embodiment, the computer processes the image of the given real-world scene (captured by the at least one camera) for producing the input image. For example, the computer may add computer graphics to the image of the given real-world scene for producing the input image.

Throughout the present disclosure, the term "image renderer" refers to equipment that, when operated, renders a given image. When the given image is rendered via its corresponding image renderer, a projection of the given image emanates from an image rendering surface of the given image renderer. Herein, the terms "first image renderer" and "second image renderer" are used merely to distinguish between different image renderers that are used for rendering different images.

Optionally, the at least one first image renderer and/or the at least one second image renderer is implemented as at least one display. Optionally, the display is selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

Optionally, the at least one first image renderer and/or the at least one second image renderer is implemented as at least one projector. In this regard, the first image and/or the second image is/are projected onto a projection screen or directly onto a retina of the user's eyes. The projector is an array projector (notably, a projector that projects an entirety of a given image upon a corresponding projection screen), a ray projector (notably, a projector that emits a light beam which is swept across a corresponding projection screen according to a scanning pattern to draw a given image), or a line projector. Optionally, the projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

Throughout the present disclosure, the term "processor" refers to hardware, software, firmware or a combination of these. The processor controls overall operation of the display apparatus. In particular, the processor is coupled to and controls operation of said means, the at least one first image renderer and the at least one second image renderer. It will be appreciated that the processor is coupled to various components of the display apparatus and optionally, controls operation of at least some of said components.

Throughout the present disclosure, the term "external processor" refers to a processor that is implemented as a processor of an external computing device. In such a case, the external computing device is communicably coupled to the display apparatus as the at least one external processor is communicably coupled to the processor. The at least one external processor is communicably coupled to the processor wirelessly and/or in a wired manner. It will be appreciated that performing, at the at least one external processor, at least some computational tasks associated with image processing is beneficial, as it would considerably reduce processing burden on the processor of the display apparatus.

The input image is processed, based upon the detected gaze direction of the user, to generate the first image and the second image. Said processing is performed by the processor or the at least one external processor. Herein, the term "input image" refers to an image that serves as an input for generating the first and second images, which are subsequently used to produce the output image. Notably, the input image is not shown to the user, whereas the output image is shown to the user.

Throughout the present disclosure, the term "second image" refers to an image that corresponds to a region of interest within the input image, whereas the term "first image" refers to an image that corresponds to at least a remaining region of the input image or a portion of the remaining region that is different from the region of interest. Herein, the term "region of interest" refers to a region in the visual scene towards which the user's gaze is directed (namely, focused).

In an embodiment, the first image represents only that remaining region of the input image or that portion of the remaining region which is different from the region of interest. In another embodiment, the first image represents an entirety of the input image.

Optionally, an angular width of the first image lies in a range of 40 degrees to 220 degrees, while an angular width of the second image lies in a range of 5 degrees to 60 degrees. For example, the angular width of the first image may be from 40, 50, 60, 70, 80, 90, 100, 110, 120, 130, 140, 150, 160, 170, 180, 190, 200 or 210 degrees up to 50, 60, 70, 80, 90, 100, 110, 120, 130, 140, 150, 160, 170, 180, 190, 200, 210 or 220 degrees. Likewise, the angular width of the second image may be from 5, 10, 15, 20, 25, 30, 35, 40, 45, 50 or 55 degrees up to 10, 15, 20, 25, 30, 35, 40, 45, 50, 55 or 60 degrees. Herein, the term "angular width" refers to an angular width of a given image with respect to the perspective of the user's eye, namely with respect to a centre of the user's gaze. It will be appreciated that the angular width of the first image is larger than the angular width of the second image.

The first image and the second image are rendered substantially simultaneously, via the at least one first image renderer and the at least one second image renderer, respectively. The processor is configured to perform said rendering operation. Upon said rendering, the projection of the first image emanates from the at least one first image renderer, whereas a projection of the second image emanates from the second image renderer. The projection of the second image is referred to herein as the "light emanating from the at least one second image renderer". It will be appreciated that rendering the first and second images substantially simultaneously allows for producing the output image as a whole, in a manner that the user views a complete output image instead of two separate images. By "substantially simultaneously", it is meant that a time instant of rendering the first image and a time instant of rendering the second image lie within 200 milliseconds of each other, and more optionally, within 20 milliseconds of each other.

Optionally, the processor or at least one external processor is configured to apply, to the second image, at least one image processing operation pertaining to distortion correction. In an embodiment, the at least one image processing operation is applied at a time of rendering the second image. In another embodiment, the at least one image processing operation is applied at a time of generating the second image. Notably, the at least one image processing operation pertains to geometric distortion correction, chromatic distortion correction, and the like.

Throughout the present disclosure, the term "configuration of reflective elements" refers to a set of reflective elements that is arranged to split the light emanating from the at least one second image renderer into the plurality of directions to produce the plurality of projections of the second image. Notably, optical properties (such as reflectance, transmittance, and the like) and the arrangement of reflective elements of the configuration cause the light emanating from the at least one second image renderer to be split into the plurality of directions. These optical properties alter an optical path of the light emanating from the at least one second image renderer.

Optionally, the reflective elements of said configuration are implemented by way of at least two of: partially-reflective mirrors, fully-reflective mirrors, partially-reflective lenses, fully-reflective lenses, partially-reflective prisms, fully-reflective prisms.

It will be appreciated that the phrase "plurality of projections of the second image" refers to at least two projections of the second image. In order to produce the least two projections of the second image, at least two reflective elements of said configuration are required to have different reflectance.

In an example, when two projections of the second image are to be produced in a 1*2 tiled layout or when four projections of the second image are to be produced in a 2*2 tiled layout, a first reflective element may be implemented as a 50/50 partially-reflective mirror having 50% reflectance while a second reflective element may be implemented as a fully-reflective mirror having 100% reflectance.

In another example, when nine projections of the second image are to be produced in a 3*3 tiled layout, a first reflective element may have 33% reflectance, a second reflective element may have 50% reflectance while a third reflective element may have a 100% reflectance.

It will also be appreciated that adjacent projections of the plurality of projections of the second image have no apparent gap therebetween. Moreover, the adjacent projections have no apparent overlap therebetween. However, practically, the adjacent projections may have minimal overlap therebetween due to optical distortions and build tolerances.

The configuration of reflective elements serves as a passive light-splitting arrangement. Notably, the number of directions into which the light is split is fixed. Optionally, the number of directions in the plurality of directions is greater than or equal to two. The number of directions may, for example, be 2, 3, 4, 5, 6, 7, 8, 9, 10, 11, 12, 13, 14, 15, 16, 17, 18, 19, 20, 21, 22, 23, 24, or 25 directions. It will be appreciated that greater the number of directions in the plurality of directions, lesser is the intensity of light that gets directed towards a single direction. As a result, lesser is the intensity of a given copy of the image that is formed on an imaginary plane by a given projection of the second image. For example, when the light emanating from the at least one second image renderer has intensity I and is split into four directions by the configuration of reflective elements, an intensity each of the four copies of the second image on the imaginary plane would be 0.25*I. Alternatively, when the light emanating from the at least one second image renderer is split into nine directions by the configuration of reflective elements, an intensity each of the nine copies of the second image on the imaginary plane would be 0.11*I.

Optionally, an angle between two adjacent directions depends upon a distance between components of the display apparatus and a required field of view of the display apparatus.

Optionally, the configuration of reflective elements comprises a set of L reflective elements that are arranged in a sequential manner, wherein L is selected from the group consisting of 2, 3, 4 and 5. By the phrase "L reflective elements are arranged in a sequential manner", it is meant that L reflective elements of the set are arranged in a sequence such that light transmitted by an (n−1)th reflective element is incident upon an nth reflective element.

As an example, the configuration of reflective elements may comprise a single set of three reflective elements that are arranged in the sequential manner. In such an example, there would be produced three projections of the second image in a 1*3 tiled manner.

Optionally, the configuration of reflective elements further comprises L sets of M reflective elements each, reflective elements of each set being arranged in a sequential manner, wherein M is selected from the group consisting of 2, 3, 4 and 5, and wherein a given set from amongst the L sets is arranged on an optical path of light reflected by a given reflective element of the set of L reflective elements. In other words, an nth set of reflective elements among the L sets of reflective elements is arranged on an optical path of light reflected by an nth reflective element of the set of L reflective elements.

In an embodiment, M is the same as L. In another embodiment, M is different from L.

In an example, the configuration of reflective elements may comprise a set of three reflective elements X1, X2, and X3 that are arranged in the sequential manner. The configuration of reflective elements may further comprise three sets S1, S2, and S3 of 2, 3, and 2 reflective elements, respectively. In the three sets S1-S3, reflective elements of each set may be arranged in the sequential manner. In such an example, the set S1 may be arranged on an optical path of light reflected by the reflective element X1, the set S2 may be arranged on an optical path of light reflected by the reflective element X2, and the set S3 may be arranged on an optical path of light reflected by the reflective element X3. In such a case, there would be produced seven projections of the second image in a 2-3-2 tiled layout (namely, a first row corresponding to two projections, a second row corresponding to three projections, and a third row corresponding to two projections).

Figure 3:
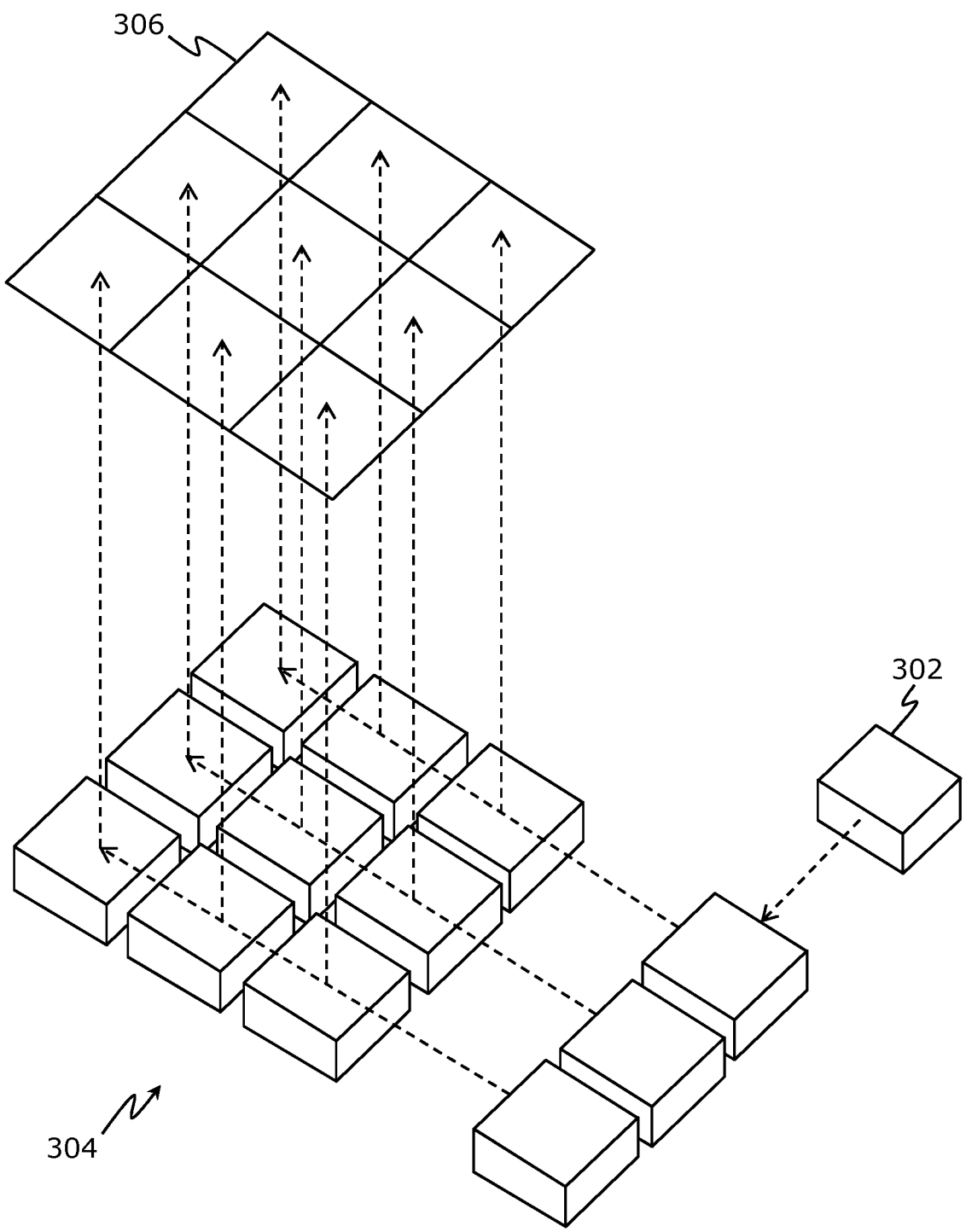
FIG. 3 is a schematic illustration of how light emanating from a second image renderer is split into a plurality of directions to produce a plurality of projections of a second image in a tiled layout, in accordance with an embodiment of the present disclosure.

In another example, the configuration of reflective elements may comprise a set of three reflective elements Y1, Y2, and Y3 that are arranged in the sequential manner. The configuration of reflective elements may further comprise three sets P1, P2, and P3 of 3 reflective elements each. In the three sets P1-P3, reflective elements of each set may be arranged in the sequential manner. In such an example, the set P1 may be arranged on an optical path of light reflected by the reflective element Y1, the set P2 may be arranged on an optical path of light reflected by the reflective element Y2, and the set P3 may be arranged on an optical path of light reflected by the reflective element Y3. In such a case, there would be produced 9 projections of the second image in a 3*3 tiled layout. Such an example configuration of reflective elements is depicted in FIG. 3.

Optionally, for a given set of N reflective elements, a first reflective element of the given set has a reflectance of 1/N, a second reflective element of the given set has a reflectance of 1/(N−1), an $N-1^{th}$ reflective element of the given set has a reflectance of ½, and an $N^{th}$ reflective element of the given set has a reflectance of 1. A given reflective element having a specific reflectance reflects that specific proportion of intensity of light incident thereupon, in a given direction. Such values of reflectance of sequentially arranged reflective elements allow for equal intensities of light to be reflected from each reflective element.

As an example, for a given set of four reflective elements R1, R2, R3, and R4 arranged in the same sequence, the first reflective element R1 has a reflectance of ¼, the second reflective element R2 has a reflectance of ⅓, the third reflective element R3 has a reflectance of ½, and the fourth reflective element R4 has a reflectance of 1. This means that the first reflective element R1 reflects ¼th of an intensity Z of light incident thereupon towards a first direction and transmits ¾th of the intensity Z of the light towards the second reflective element R2. Then, the second reflective element R2 reflects ⅓rd of the intensity **0.75*Z** of the light incident thereupon towards a second direction and transmits ⅔rds of the intensity 0.75*Z of the light towards the third reflective element R3. Then, the third reflective element R3 reflects ½ of the intensity 0.5*Z of the light incident thereupon towards a third direction and transmits ½ of the intensity 0.5*Z of the light towards the fourth reflective element R4. The fourth reflective element R4 reflects whole of the intensity 0.25*Z of the light incident thereupon towards a fourth direction. In this way, each of the four reflective elements R1-R4 reflect one-fourth of the original intensity Z of the light incident upon the reflective element R1 therefrom.

Optionally, the display apparatus further comprises at least one light blocker arranged in between the configuration of reflective elements, wherein the at least one light blocker prevents leakage of light from the configuration of reflective elements.

The configuration of reflective elements produces a plurality of projections of the second image in the tiled layout. When the plurality of projections are incident upon an imaginary plane in their optical path, these projections produce a plurality of copies of the second image on the imaginary plane. As a result, the second image is effectively formed over a large field of view.

Optionally, the tiled layout is a rectangular tiled layout. In the rectangular tiled layout, the plurality of projections of the second image are arranged in rows and columns in a manner that an overall shape of said arrangement is rectangular. In an example, nine projections of the second image may be produced in a 3*3 rectangular tiled layout. One such tiled layout has been illustrated in FIG. 3. In another example, six projections of the second image may be produced in a 2*3 rectangular tiled layout.

Alternatively, optionally, the tiled layout is a hexagonal tiled layout. In the hexagonal tiled layout, the plurality of projections of the second image are arranged in a manner that an overall shape of said arrangement is hexagonal (for example, honeycomb-like). In an example, seven projections of the second image may be produced in a 2-3-2 hexagonal tiled layout. Notably, a first row of the tiled layout may include two projections of the second image, a second row of the tiled layout may include three projections, and a third row of the tiled layout may include two projections. The first, second, and third rows may be aligned in a hexagonal shape.

It will be appreciated that the hexagonal tiled layout is preferred over the rectangular tiled layout in cases where the output image to be produced has a circular shape, as a hexagon closely better approximates the shape of a circle as compared to a rectangle. It will also be appreciated that optionally, the tiled layout is a circular tiled layout, an elliptical tiled layout, and the like.

Optionally, the display apparatus further comprises a collimator arranged between the at least one second image renderer and the configuration of reflective elements. The collimator focuses light emanating from pixels of the at least one second image renderer as the light travels from the at least one second image renderer towards the configuration of reflective elements. In particular, the collimator minimizes spreading of light emanating from each pixel of the at least one second image renderer.

Optionally, the collimator is implemented as a perforated plate. Alternatively, optionally, the collimator is implemented as a lenticular array. Yet alternatively, optionally, the collimator is implemented as an array of nanotubes, wherein each nanotube of the array collimates light emanating from a single pixel of the at least one second image renderer.

Throughout the present disclosure, the term "opacity mask" refers to an element that is controllable to selectively pass through itself only a specific portion of light incident thereupon, whilst blocking a remaining portion of the light incident thereupon. The opacity mask is controllable to control light that is passed from the configuration of reflective elements towards the optical combiner. The processor controls the opacity mask, to allow only that portion of the plurality of projections of the second image which corresponds to a region of the image plane at which the user's gaze is directed to pass through the opacity mask. The remaining portion of the plurality of projections of the second image is blocked by the opacity mask and is not passed towards the optical combiner.

It will be appreciated that the gaze direction of the user with respect to the image plane would keep changing as the user views the visual scene. Accordingly, the given portion of the plurality of projections of the second image that is to be passed through the opacity mask would also keep changing.

It will be appreciated that in some implementations, the given portion of the plurality of projections of the second image corresponds to a single projection of the second image, whereas in other implementations, the given portion of the plurality of projections of the second image corresponds to portions of at least two projections of the second image.

Optionally, the opacity mask is implemented by way of a spatial light modulator. Optionally, in this regard, the spatial light modulator is an electrically addressable spatial light modulator. Notably, the processor is configured to control the spatial light modulator by way of an electrical control signal, to allow or block passage of light through the spatial light modulator. Examples of the spatial light modulator include, but are not limited to, a Digital Micromirror Device®, a Liquid Crystal on Silicon (LCoS)-based display, a Ferroelectric Liquid Crystal on Silicon (FLCoS)-based display, and a nematic liquid crystal-based display.

Alternatively, optionally, the opacity mask is implemented by way of a Liquid Crystal (LC) shutter matrix. The LC shutter matrix comprises a plurality of LCDs which are controllable to toggle between an open state and a closed state by application of a control signal. In the open state, a given LCD is transparent and allows light to pass therethrough. Alternatively, in the closed state, the given LCD is opaque and blocks light from passing therethrough. It will be appreciated that sizes of the plurality of LCDs in the LC shutter matrix are to be selected such that the smallest addressable portion of the plurality of projections of the second image is incident upon a single LCD. As an example, each LCD in the LC shutter matrix has dimensions that are suitable to receive light rays emanating from only a single pixel of the at least one second image renderer. This allows for greater control in selectively allowing only the given portion of the plurality of projections of the second image to pass through the opacity mask.

Throughout the present disclosure, the term "optical combiner" refers to equipment (for example, such as optical components) for optically combining the projection of the first image with the given portion of the plurality of projections of the second image. The optical combiner optically combines the projection of the first image with the given portion of the plurality of projections of the second image to constitute a combined projection, wherein the combined projection is a projection of the output image. When the combined projection is incident on the image plane, the output image is produced on the image plane.

Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer.

Optionally, when the first image represents an entirety of the input image, the processor or the at least one external processor is configured to mask a region of the first image that corresponds to the region of interest within the input image, wherein the optical combiner is arranged to optically combine the projection of the first image with the given portion of the plurality of projections of the second image in a manner that the given portion of the plurality of projections of the second image substantially overlaps the projection of the masked region of the first image.

It will be appreciated that said masking operation is performed in order to avoid optical distortion of the region interest, when the projection of the first image is optically combined with the given portion of the plurality of projections.

Throughout the present disclosure, the term "output image" refers to an image that is produced on the image plane. Notably, the output image is visible to the user.

Optionally, the output image has the spatially-variable resolution. Optionally, in this regard, the first image has a first resolution, while the second image has a second resolution, the second resolution being higher than the first resolution. When the first image and the second image are optically combined to produce the output image, the output image has a spatially-variable resolution. By "spatially-variable resolution", it is meant that resolution of the output image varies spatially across the image plane. Throughout the present disclosure, the term "resolution" refers to the number of pixels per degree (namely, points per degree (PPD)) of a given region of the output image, from a perspective of the user's eyes. In simpler terms, the term "resolution" refers to visual detail that the output image holds.

Optionally, the output image comprises a first region and a second region, wherein a resolution of the second region of the output image is greater than a resolution of the first region of the output image. Beneficially, the resolution of the second region of the output image is comparable to a normal human-eye resolution. Therefore, the output image having the spatially-variable resolution mimics foveation characteristics of the human visual system. In such a case, the display apparatus emulates foveation characteristics of the human visual system.

Optionally, the resolution of the second region of the output image is greater than or equal to twice the resolution of the first region of the output image. More optionally, the resolution of the second region is greater than or equal to six times the resolution of the first region. It will be appreciated that when the user views the output image, the second region thereof appears to have more visual detail with respect to the first region thereof. As an example, the resolution of the second region of the output image may be approximately 90 pixels per degree, while the resolution of the first region of the output image may be approximately 15 pixels per degree.

Optionally, the projection of the first image produces the first region of the output image, whereas the given portion of the plurality of projections of the second image produces the second region of the output image. Optionally, the second region of the output image is produced upon the region of the image plane at which the user's gaze is directed, whereas the first region of the output image is produced upon a remaining region or a portion of the remaining region of the image plane.

It will be appreciated that when the second image has the second resolution (which is higher than the first resolution), the configuration of reflective elements allows for providing high-resolution second images across a large field of view.

According to an embodiment, the processor or the at least one external processor is configured to determine, based upon the detected gaze direction of the user, a region of interest within the input image and a region of the image plane at which the user's gaze is directed,
wherein, when generating the second image, the processor or the at least one external processor is configured to:
crop a portion of the input image that includes the region of interest;
pad the cropped portion of the input image to generate an intermediate image; and
divide the intermediate image into a plurality of portions and reorganize the plurality of portions to generate the second image, based on the region of the image plane at which the user's gaze is directed.

Such a manner of generating the second image is employed when the region of the image plane at which the user's gaze is directed does not correspond exactly to the region of incidence of a single projection among the plurality of projections of the second image. In other words, such a manner of generating the second image is employed when the given portion of the plurality of projections of the second image corresponds to portions of the at least two projections of the second image.

In such a case, the given portion of the plurality of projections of the second image represents the second image in a jumbled (namely, disordered) form. As a result, at the image plane, the second region of the output image would be produced in a muddled-up form that is different from the way the second image was rendered at the second image renderer. Therefore, in such a case, the second image is generated in the aforesaid manner (described in more detail hereinbelow) to ensure that the second region of the output image is produced in a required ordered from.

Optionally, the portion of the input image that includes the region of interest is cropped. This is done so as to include the region of interest in the second image. Optionally, the cropped portion of the input image is padded to generate the intermediate image. The term "intermediate image" refers to an image that represents the cropped portion of the input image and its corresponding padding. The intermediate image is not shown to the user, and is generate merely to enable generation of the second image. It will be appreciated that this padding operation allows for compensating for loss of image content when the second image would be projected towards the image plane. Moreover, padding the cropped portion of the input image could also help in maintaining features of the cropped portion. Image padding techniques are well known in the art.

Optionally, a number of portions into which the intermediate image is divided is equal to a number of projections of the second image that would be incident on the region of the image plane at which the user's gaze is directed. Moreover, optionally, the plurality of portions of the intermediate image are reorganized to generate the second image. The step of dividing and reorganizing is performed in a manner that the given portion of the plurality of projections of the second image is representative of the region of interest. As an example, when four projections of the second image would be incident on the region of the image plane at which the user's gaze is directed, the intermediate image is divided into four portions that are reorganized to generate the second image.

Optionally, when generating the second image, the processor or the at least one external processor is configured to:
divide the intermediate image into two portions when the gaze direction corresponds to a region of the image plane whereat two of the plurality of projections of the second image would be incident, and swap positions of the two portions; or
divide the intermediate image into four portions when the gaze direction of the user corresponds to a region of the image plane whereat four of the plurality of projections of the second image would be incident, and diagonally swap positions of the four portions.

According to another embodiment, the processor or the at least one external processor is configured to determine, based upon the detected gaze direction of the user, a region of interest within the input image and a region of the image plane at which the user's gaze is directed,
wherein, when generating the second image, the processor or the at least one external processor is configured to:
crop a portion of the input image that includes the region of interest; and
pad the cropped portion of the input image to generate the second image.

Such a manner of generating the second image is employed when the region of the image plane at which the user's gaze is directed corresponds exactly to a region of the image plane whereat any one of the plurality of projections of the second image would be incident. In such a case, the given portion of the plurality of projections of the second image corresponds to exactly one projection of the second image among the plurality of projections. Therefore, the given portion of the plurality of projections represents the second image in the same form as the form in which the second image is rendered. As a result, at the image plane, the second region of the output image would be produced in the same form as the rendered second image. Therefore, in such a case, the input image is simply cropped to obtain the portion that includes the region of interest, and the cropped portion of the input image is padded to generate the second image.

The present disclosure also relates to the method as described above. Various embodiments and variants disclosed above apply mutatis mutandis to the method.

Optionally, in the method, the tiled layout is a rectangular tiled layout.

Alternatively, optionally, in the method, the tiled layout is a hexagonal tiled layout.

Optionally, in the method, the configuration of reflective elements comprises a set of L reflective elements that are arranged in a sequential manner, wherein L is selected from the group consisting of 2, 3, 4 and 5.

Optionally, in the method, the configuration of reflective elements further comprises L sets of M reflective elements each, reflective elements of each set being arranged in a sequential manner, wherein M is selected from the group consisting of 2, 3, 4 and 5, and wherein a given set from amongst the L sets is arranged on an optical path of light reflected by a given reflective element of the set of L reflective elements.

Optionally, in the method, for a given set of N reflective elements, a first reflective element of the given set has a reflectance of 1/N, a second reflective element of the given set has a reflectance of 1/(N−1), an $N-1^{th}$ reflective element of the given set has a reflectance of ½, and an $N^{th}$ reflective element of the given set has a reflectance of 1.

Optionally, the method further comprises employing a collimator to collimate light beams emanating from the at least one second image renderer.

Optionally, the method further comprises:

determining, based upon the detected gaze direction of the user, a region of interest within the input image and a region of the image plane at which the user's gaze is directed;

cropping a portion of the input image that includes the region of interest;

padding the cropped portion of the input image to generate an intermediate image; and dividing the intermediate image into a plurality of portions and reorganize the plurality of portions to generate the second image, based on the region of the image plane at which the user's gaze is directed.

DETAILED DESCRIPTION OF THE DRAWINGS

Referring to FIG. 1, illustrated is a block diagram of architecture of a display apparatus 100, in accordance with an embodiment of the present disclosure. The display apparatus 100 comprises means 102 for detecting a gaze direction of a user with respect to an image plane, at least one first image renderer (depicted as a first image renderer 104), at least one second image renderer (depicted as a second image renderer 106), a processor 108, a configuration 110 of reflective elements, an optical combiner 112 and an opacity mask 114.

The processor 108 is coupled to said means 102, the first image renderer 104 and the second image renderer 106. The processor 108 or at least one external processor (depicted as an external processor 116) communicably coupled to the processor 108 is configured to process an input image, based upon the detected gaze direction of the user, to generate a first image and a second image. The processor 108 is configured to render the first image and the second image substantially simultaneously, via the first image renderer 104 and the second image renderer 106, respectively.

The configuration 110 of reflective elements is arranged to split light emanating from the second image renderer 106 into a plurality of directions to produce a plurality of projections of the second image in a tiled layout, wherein at least two reflective elements of said configuration 110 have different reflectance.

The opacity mask 114 is arranged on an optical path between the configuration 110 of reflective elements and the optical combiner 112, wherein the processor 108 is configured to control the opacity mask 114, based upon the detected gaze direction, to selectively allow a given portion of the plurality of projections of the second image to pass through towards the optical combiner 112, whilst blocking a remaining portion of said plurality of projections.

The optical combiner 112 is arranged to optically combine a projection of the first image with the given portion of the plurality of projections of the second image, to produce on the image plane an output image to be presented to the user.

Figure 2:
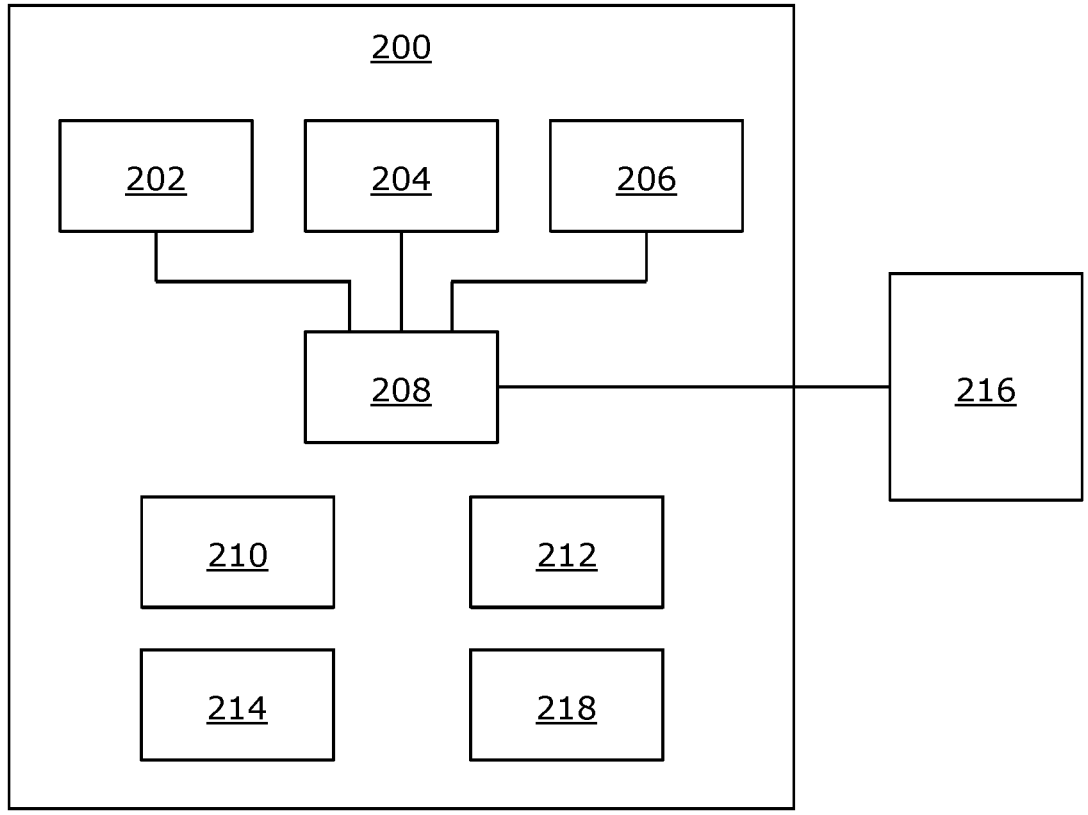

Referring to FIG. 2, illustrated is a block diagram of architecture of a display apparatus 200, in accordance with another embodiment of the present disclosure. The display apparatus 200 comprises means 202 for detecting a gaze direction of a user with respect to an image plane, at least one first image renderer (depicted as a first image renderer 204), at least one second image renderer (depicted as a second image renderer 206), a processor 208, a configuration 210 of reflective elements, an optical combiner 212 and an opacity mask 214. The processor 208 is coupled to said means 202, the first image renderer 204 and the second image renderer 206. There is also shown at least one external processor (depicted as an external processor 216) communicably coupled to the processor 208.

The display apparatus 200 further comprises a collimator 218 arranged between the second image renderer 206 and the configuration 210 of reflective elements.

It may be understood by a person skilled in the art that FIG. 1 and FIG. 2 include simplified architectures of the display apparatuses 100 and 200, respectively, for sake of clarity, which should not unduly limit the scope of the claims herein. The person skilled in the art will recognize many variations, alternatives, and modifications of embodiments of the present disclosure.

Referring to FIG. 3, illustrated is a schematic illustration of how light emanating from a second image renderer 302 is split into a plurality of directions to produce a plurality of projections of a second image in a tiled layout, in accordance with an embodiment of the present disclosure. A configuration 304 of reflective elements is arranged to split the light into the plurality of directions. The plurality of projections of the second image are incident upon an imaginary plane 306 that is arranged on an optical path between the configuration 304 of reflective elements and an opacity mask (not shown). In particular, the light emanating from the second image renderer 302 is shown to be split into nine directions by 12 reflective elements of the configuration 304 to produce nine projections of the second image (depicted by way of dashed arrows). Such nine projections of the second image would form nine copies of the second image upon being incident on the imaginary plane 306.

Figure 4A:
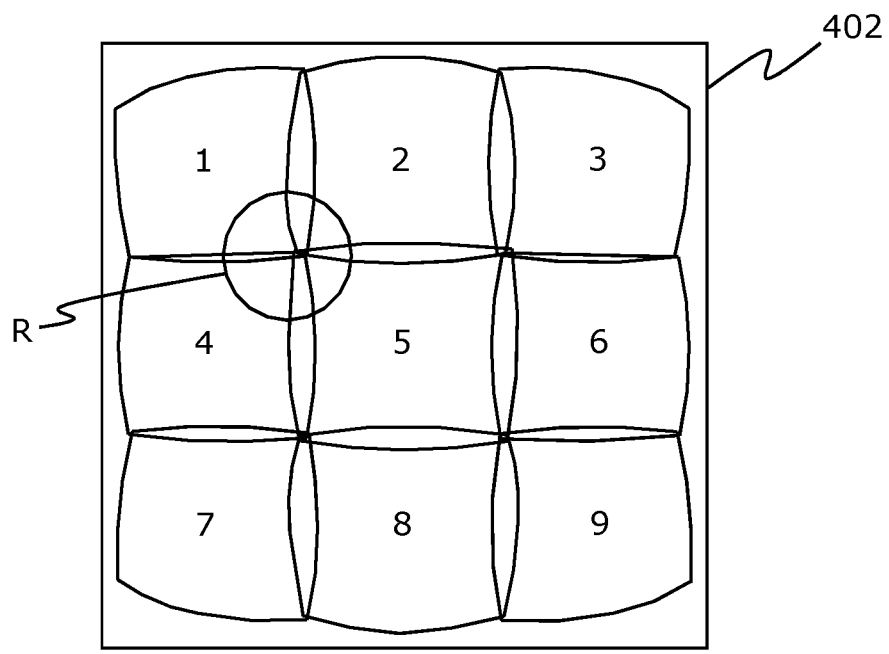
FIG. 4A illustrates an example scenario where gaze direction of a user corresponds to a region of an imaginary plane whereat four out of a plurality of projections of a second image are incident.
Figure 4B:
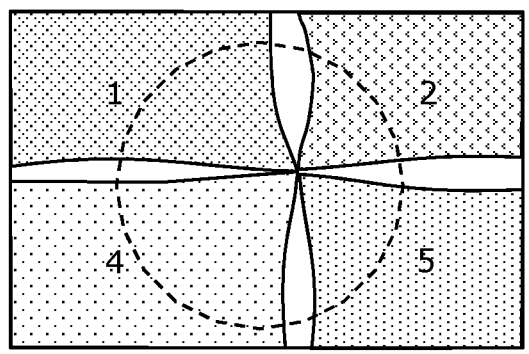
FIG. 4B illustrates a zoomed-in representation of the region.
Figure 4C:
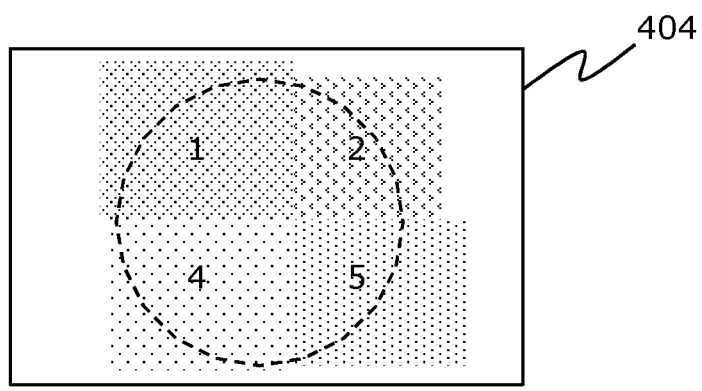
FIG. 4C illustrates an intermediate image.
Figure 4D:
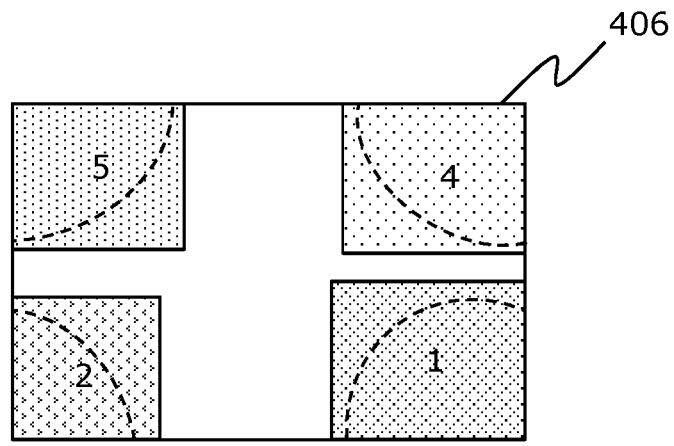
Figure 4E:
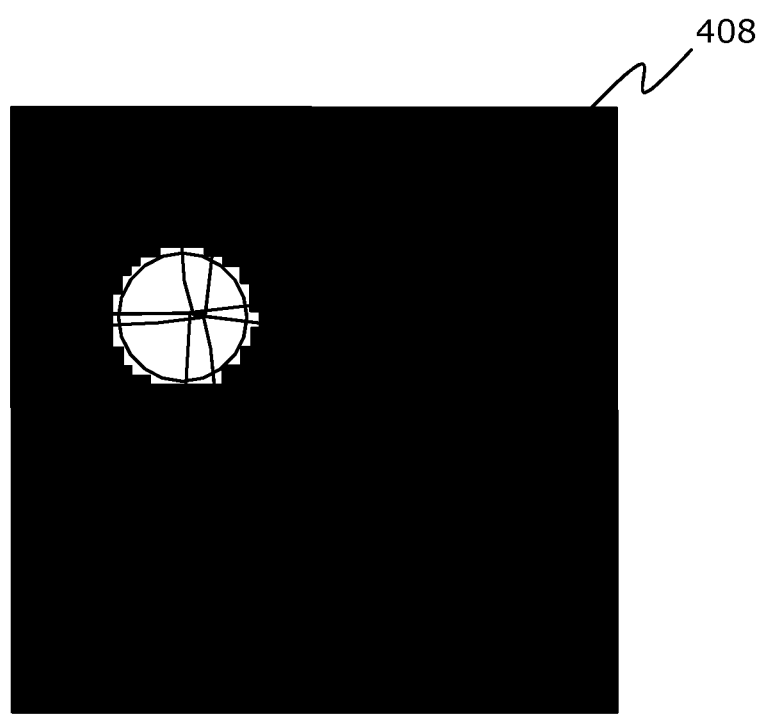
FIG. 4E illustrates an opacity mask corresponding to the gaze direction of the user, in accordance with an embodiment of the present disclosure.

Referring to FIGS. 4A, 4B, 4C, 4D and 4E, FIG. 4A illustrates an example scenario where gaze direction of a user corresponds to a region R of an imaginary plane 402 whereat four out of a plurality of projections of a second image are incident, FIG. 4B illustrates a zoomed-in representation of the region R, FIG. 4C illustrates an intermediate image 404, FIG. 4D illustrates the second image 406 to be rendered, while FIG. 4E illustrates an opacity mask 408 corresponding to the gaze direction of the user, in accordance with an embodiment of the present disclosure.

In the example scenario, light emanating from a second image renderer (not shown) is split into nine directions to produce nine projections of the second image. In FIG. 4A, these nine projections of the second image are shown to be incident upon the imaginary plane 402 to form nine copies (depicted as numbers 1-9 in FIG. 4A) of the second image. Notably, the imaginary plane 402 is on an optical path between a configuration of reflective elements (not shown) and the opacity mask 408. The encircled region R of the imaginary plane 402 corresponds to a region of an image plane whereat the gaze direction of the user is focused. This region R corresponds to a region of interest to the user.

In FIG. 4B, the zoomed-in representation of the region R of the imaginary plane 402 is shown to comprise four unequal-sized portions of the copies numbered '1', '2', '4' and '5'. Portions of different copies are depicted as different hatched portions.

In FIG. 4C, there is shown the intermediate image 404. A region of an input image (not shown) that includes the region of interest is cropped, and the cropped region is padded to generate the intermediate image 404. The hatched portions of the intermediate image represent the cropped region of the input image, whereas un-hatched portions of the intermediate image 404 represent the padding.

In FIG. 4D, the second image 406 is also shown to comprise the four unequal-sized portions of the copies numbered '1', '2', '4' and '5', wherein an arrangement of the four unequal-sized portions in the second image 406 is different from an arrangement of the four unequal sized portions in the intermediate image 404. Notably, positions of the four unequal sized portions in the intermediate image 404 are diagonally swapped to generate the second image 406. In such a case, the positions of the portions of copies 1 and 5 are swapped with each other, and the positions of the portions of copies 2 and 4 are swapped with each other.

In FIG. 4E, the opacity mask 408 corresponding to the gaze direction of the user is shown. The opacity mask 408 selectively allows the given portion of the plurality of projections of the second image corresponding to the region R (of the imaginary plane 402) to pass through towards an optical combiner (not shown), whilst blocking a remaining portion of said plurality of projections.

Figure 5A:
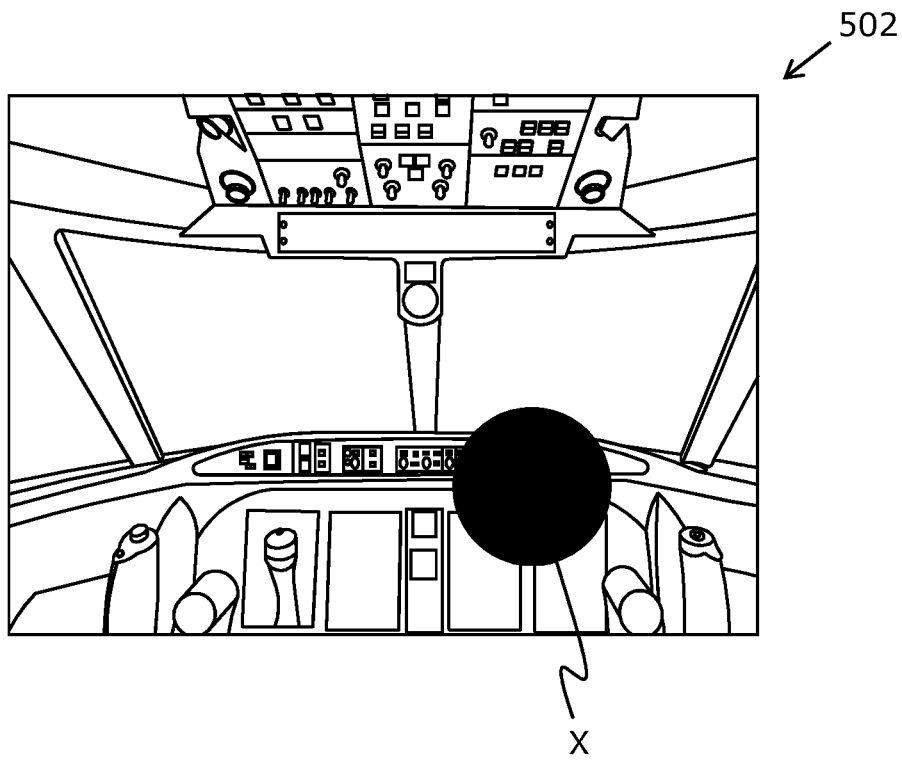
FIG. 5A illustrates an input image.
Figure 5B:
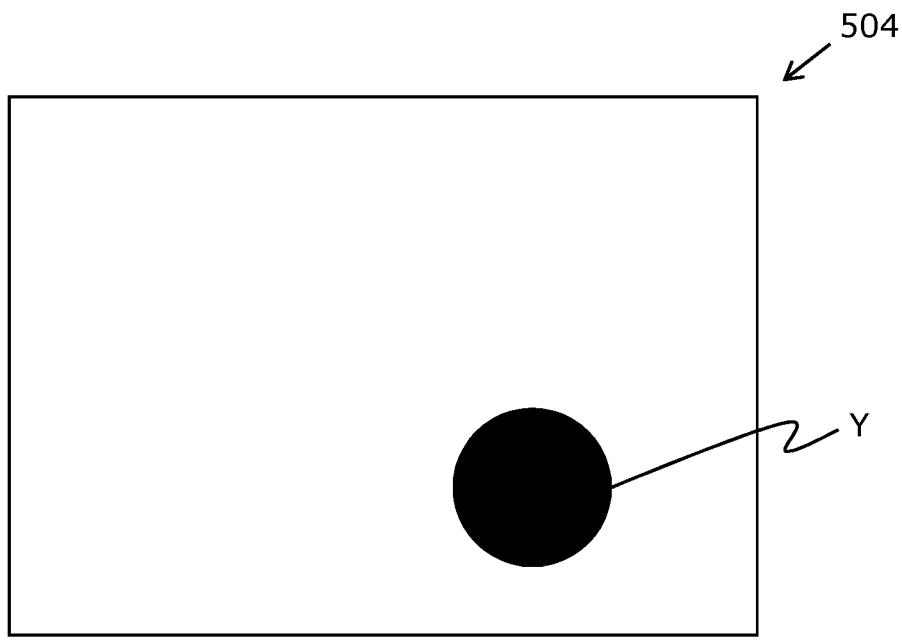
FIG. 5B illustrates a region of an image plane at which the user's gaze is directed.
Figure 5C:
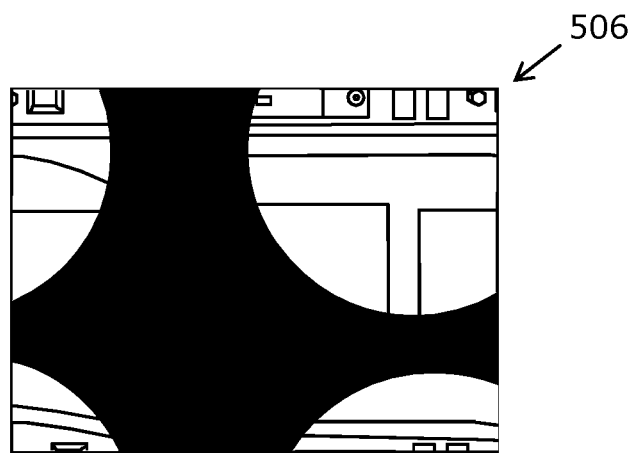
FIG. 5C illustrates a second image.
Figure 5D:
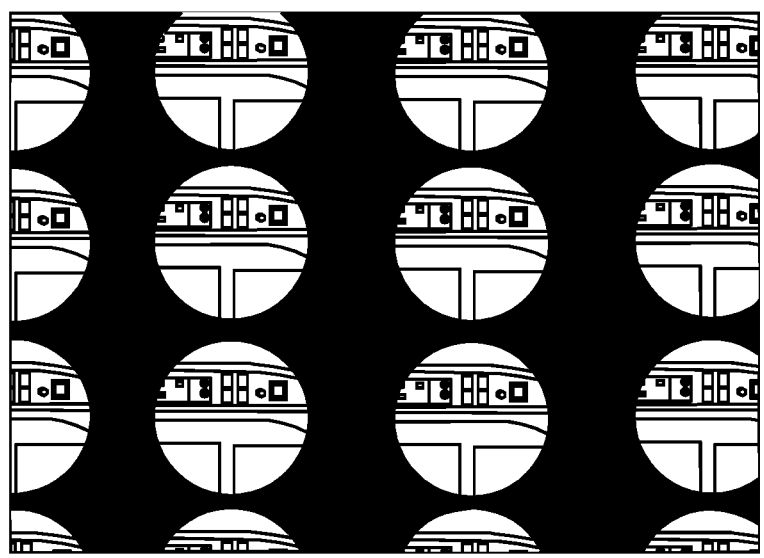
FIG. 5D illustrates a tiled layout of a plurality of projections of the second image.
Figure 5E:
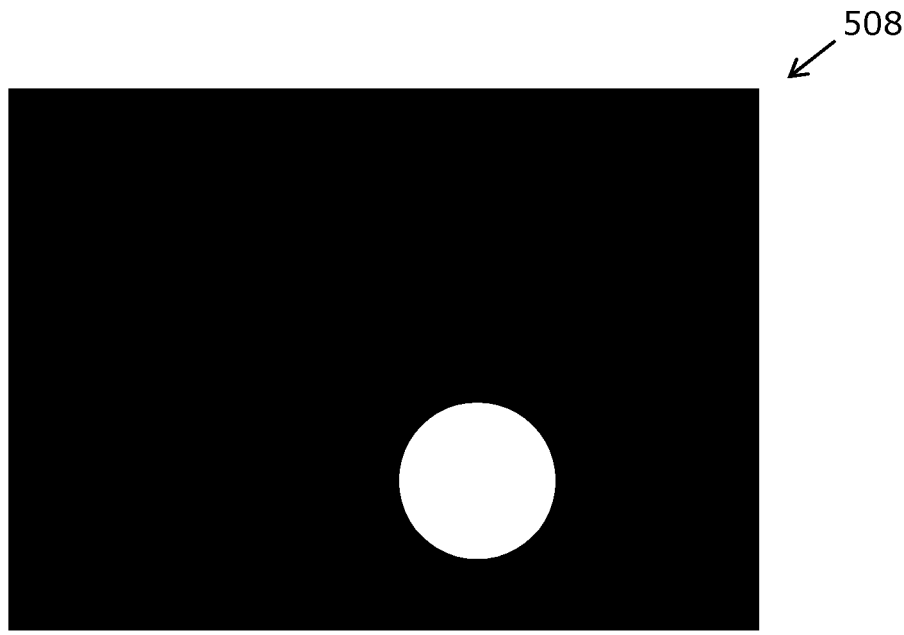
FIG. 5E illustrates an opacity mask corresponding to the gaze direction of the user with respect to the image plane.
Figure 5F:
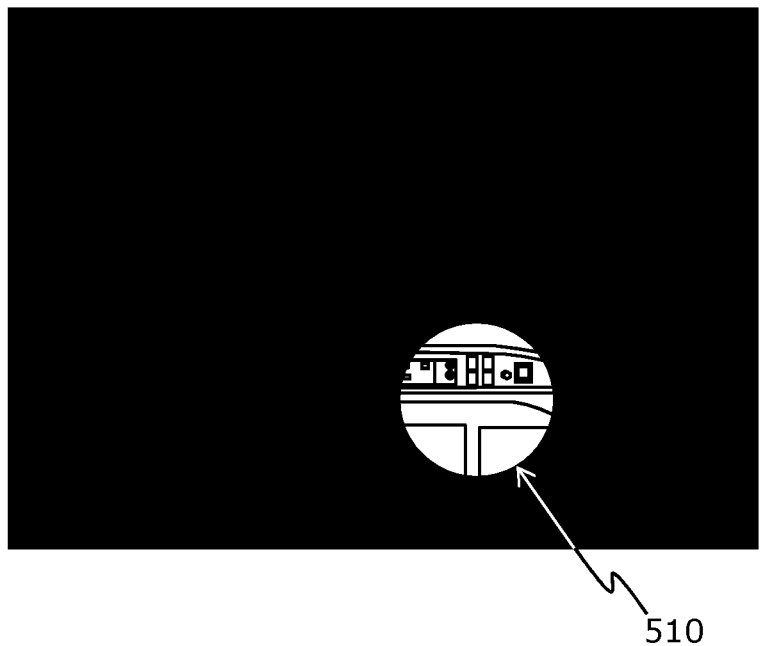
FIG. 5F illustrates how a given portion of the plurality of projections of the second image passes through the opacity mask, in accordance with an embodiment of the present disclosure.

Referring to FIGS. 5A, 5B, 5C, 5D, 5E and 5F, FIG. 5A illustrates an input image 502, FIG. 5B illustrates a region of an image plane 504 at which the user's gaze is directed, FIG. 5C illustrates a second image 506, FIG. 5D illustrates a tiled layout of a plurality of projections of the second image, FIG. 5E illustrates an opacity mask 508 corresponding to the detected gaze direction of the user with respect to the image plane 504, and FIG. 5F illustrates how a given portion 510 of the plurality of projections of the second image passes through the opacity mask 508, in accordance with an embodiment of the present disclosure.

In FIG. 5A, the input image 502 depicts an airplane cockpit. A blackened region X is a region of interest within the input image 502.

In FIG. 5B, a blackened region Y is the region of the image plane 504 at which the user's gaze is directed.

In FIG. 5C, there is shown the second image 506. In order to generate the second image 506, a portion of the input image 502 that includes the region of interest X is cropped, the cropped portion is padded to generate an intermediate image (not shown), and the intermediate image is divided into a plurality of portions (for example, four portions) that are reorganized to yield the second image 506. The blackened areas of the second image 506 correspond to the padding whereas the remaining four portions are parts of the region of interest X of the input image 502.

In FIG. 5D, there is shown the tiled layout of the plurality of projections (specifically, nine projections) of the second image 506. This tiled layout would be formed when the plurality of projections of the second image 506 are incident upon an imaginary plane arranged between a configuration of reflective elements (not shown) and the opacity mask 508.

In FIG. 5E, the opacity mask 508 corresponding to the detected gaze direction of the user with respect to the image plane 504 is shown. The white portion of the opacity mask 508 corresponds to a region of the opacity mask 508 that allows the given portion of the plurality of projections of the second image 506 to pass through, whereas the black portion of the opacity mask 508 corresponds to a remaining region of the opacity mask 508 that blocks a remaining portion of said plurality of projections.

In FIG. 5F, the given portion 510 of the plurality of projections of the second image is shown to pass through the white portion of the opacity mask 508.

Figure 6A:
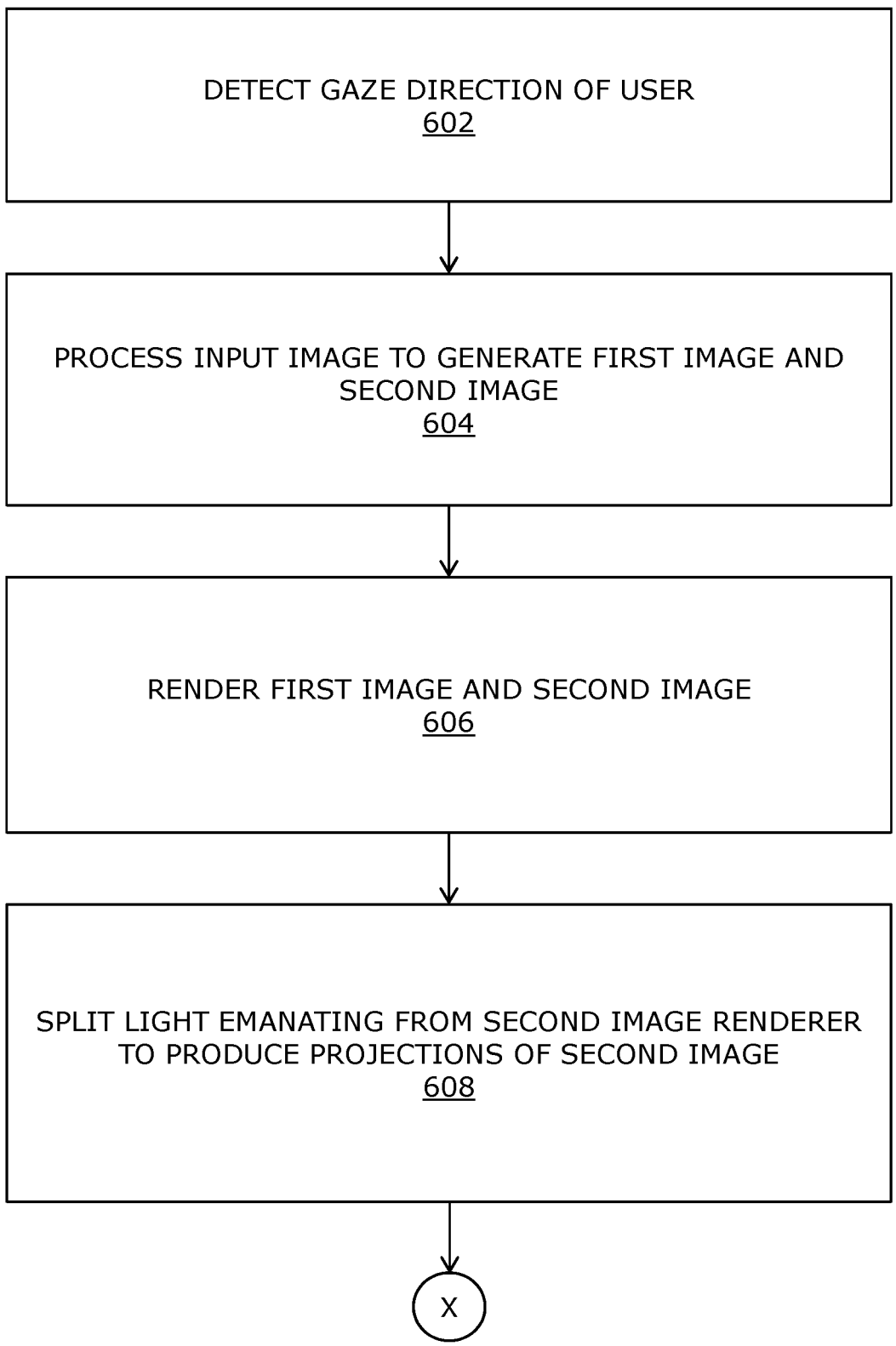
FIGS. 6A and 6B illustrate steps of a method, in accordance with an embodiment of the present disclosure.
Figure 6B:
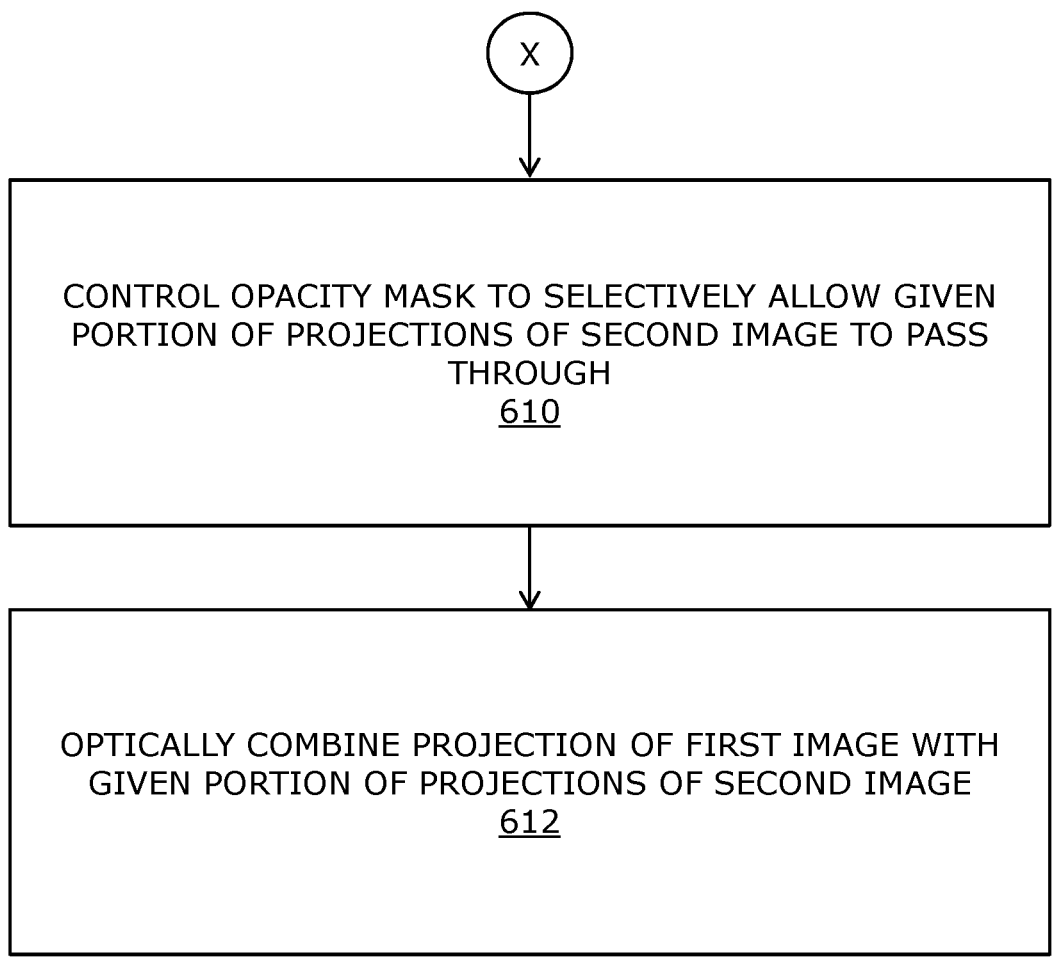

Referring to FIGS. 6A and 6B, illustrated are steps of a method, in accordance with an embodiment of the present disclosure. At step 602, a gaze direction of a user with respect to an image plane is detected. At step 604, an input image is processed, based upon the detected gaze direction of the user, to generate a first image and a second image. At step 606, the first image and the second image are rendered substantially simultaneously, via at least one first image renderer and at least one second image renderer, respectively. At step 608, light emanating from the at least one second image renderer is split, via a configuration of reflective elements, into a plurality of directions to produce a plurality of projections of the second image in a tiled layout. At least two reflective elements of said configuration have different reflectance. At step 610, an opacity mask is controlled, based upon the detected gaze direction, to selectively allow a given portion of the plurality of projections of the second image to pass through towards an optical combiner, whilst blocking a remaining portion of said plurality of projections. At step 612, a projection of the first image is optically combined, via the optical combiner, with the given portion of the plurality of projections of the second image, to produce on the image plane an output image to be presented to the user.

The steps 602, 604, 606, 608, 610 and 612 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
   means for detecting a gaze direction of a user with respect to an image plane;
   at least one first image renderer;
   at least one second image renderer;
   a processor coupled to said means, the at least one first image renderer and the at least one second image renderer, wherein the processor or at least one external processor communicably coupled to the processor is configured to process an input image, based upon the detected gaze direction of the user, to generate a first image and a second image, and wherein the processor is configured to render the first image and the second image substantially simultaneously, via the at least one first image renderer and the at least one second image renderer, respectively;

a configuration of reflective elements arranged to split light emanating from the at least one second image renderer into a plurality of directions to produce a plurality of projections of the second image in a tiled layout, wherein at least two reflective elements of said configuration have different reflectance;

an optical combiner; and an opacity mask arranged on an optical path between the configuration of reflective elements and the optical combiner, wherein the processor is configured to control the opacity mask, based upon the detected gaze direction, to selectively allow a given portion of the plurality of projections of the second image to pass through towards the optical combiner, whilst blocking a remaining portion of said plurality of projections, wherein the optical combiner is arranged to optically combine a projection of the first image with the given portion of the plurality of projections of the second image, to produce on the image plane an output image to be presented to the user;

wherein the processor or the at least one external processor is configured to determine, based upon the detected gaze direction of the user, a region of interest within the input image and a region of the image plane at which the user's gaze is directed, wherein, when generating the second image, the processor or the at least one external processor is configured to:

crop a portion of the input image that includes the region of interest;

pad the cropped portion of the input image to generate an intermediate image; and divide the intermediate image into a plurality of portions and reorganize the plurality of portions to generate the second image, based on the region of the image plane at which the user's gaze is directed.

2. The display apparatus of claim 1, wherein the tiled layout is a rectangular tiled layout.

3. The display apparatus of claim 1, wherein the tiled layout is a hexagonal tiled layout.

4. The display apparatus of claim 1, wherein the configuration of reflective elements comprises a set of L reflective elements that are arranged in a sequential manner, wherein L is selected from the group consisting of 2, 3, 4 and 5.

5. The display apparatus of claim 4, wherein the configuration of reflective elements further comprises L sets of M reflective elements each, reflective elements of each set being arranged in a sequential manner, wherein M is selected from the group consisting of 2, 3, 4 and 5, and wherein a given set from amongst the L sets is arranged on an optical path of light reflected by a given reflective element of the set of L reflective elements.

6. The display apparatus of claim 4, wherein for a given set of N reflective elements, a first reflective element of the given set has a reflectance of 1/N, a second reflective element of the given set has a reflectance of 1/(N−1), an N−1$^{th}$ reflective element of the given set has a reflectance of ½, and an N$^{th}$ reflective element of the given set has a reflectance of 1.

7. The display apparatus of claim 1, further comprising a collimator arranged between the at least one second image renderer and the configuration of reflective elements.

8. A method comprising:

detecting a gaze direction of a user with respect to an image plane;

processing an input image, based upon the detected gaze direction of the user, to generate a first image and a second image;

rendering the first image and the second image substantially simultaneously, via at least one first image renderer and at least one second image renderer, respectively;

splitting, via a configuration of reflective elements, light emanating from the at least one second image renderer into a plurality of directions to produce a plurality of projections of the second image in a tiled layout, wherein at least two reflective elements of said configuration have different reflectance;

controlling an opacity mask, based upon the detected gaze direction, to selectively allow a given portion of the plurality of projections of the second image to pass through towards an optical combiner, whilst blocking a remaining portion of said plurality of projections;

optically combining, via the optical combiner, a projection of the first image with the given portion of the plurality of projections of the second image, to produce on the image plane an output image to be presented to the user;

determining, based upon the detected gaze direction of the user, a region of interest within the input image and a region of the image plane at which the user's gaze is directed;

cropping a portion of the input image that includes the region of interest;

padding the cropped portion of the input image to generate an intermediate image; and dividing the intermediate image into a plurality of portions and reorganize the plurality of portions to generate the second image, based on the region of the image plane at which the user's gaze is directed.

9. The method of claim 8, wherein the tiled layout is a rectangular tiled layout.

10. The method of claim 8, wherein the tiled layout is a hexagonal tiled layout.

11. The method of claim 8, wherein the configuration of reflective elements comprises a set of L reflective elements that are arranged in a sequential manner, wherein L is selected from the group consisting of 2, 3, 4 and 5.

12. The method of claim 11, wherein the configuration of reflective elements further comprises L sets of M reflective elements each, reflective elements of each set being arranged in a sequential manner, wherein M is selected from the group consisting of 2, 3, 4 and 5, and wherein a given set from amongst the L sets is arranged on an optical path of light reflected by a given reflective element of the set of L reflective elements.

13. The method of claim 11, wherein for a given set of N reflective elements, a first reflective element of the given set has a reflectance of 1/N, a second reflective element of the given set has a reflectance of 1/(N−1), an N−1$^{th}$ reflective element of the given set has a reflectance of ½, and an N$^{th}$ reflective element of the given set has a reflectance of 1.

14. The method of claim 8, further comprising employing a collimator to collimate light beams emanating from the at least one second image renderer.

* * * * *